United States Patent [19]

Komauer et al.

[11] 4,398,868
[45] Aug. 16, 1983

[54] CONTROL APPARATUS FOR A GAS DYNAMIC PRESSURE-WAVE MACHINE FOR CHARGING COMBUSTION ENGINES

[75] Inventors: Christian Komauer, Nussbaumen; Andreas Mayer, Niederrohrdorf, both of Switzerland

[73] Assignee: BBC Brown, Boveri & Company Limited, Baden, Switzerland

[21] Appl. No.: 254,873

[22] Filed: Apr. 16, 1981

[30] Foreign Application Priority Data

May 2, 1980 [EP] European Pat. Off. ............ 80200410

[51] Int. Cl.³ .......................... F04F 5/32; F04F 11/02
[52] U.S. Cl. .................................... 417/64; 60/39.45
[58] Field of Search ................. 60/39.45 A; 123/559; 417/64

[56] References Cited

U.S. PATENT DOCUMENTS

| 2,800,120 | 7/1957 | Jendrassik . | |
| 3,221,981 | 12/1965 | Spalding | 417/64 |
| 3,968,435 | 1/1971 | Jendrassik | 417/64 |
| 4,232,999 | 11/1980 | Croes | 417/64 |

FOREIGN PATENT DOCUMENTS 967525   8/1964   United Kingdom ................ 417/64

Primary Examiner—William L. Freeh
Assistant Examiner—Jane Obee
Attorney, Agent, or Firm—Werner W. Kleeman

[57] ABSTRACT

A control apparatus for a gas dynamic pressure-wave machine for charging combustion engines. The inflow cross-sectional area of the gas pocket in the high-pressure exhaust channel is controlled in accordance with the desired operating conditions of the engine by a bimetallic flap or valve member as a function of the temperature of the high-pressure exhaust gas.

7 Claims, 17 Drawing Figures

CONTROL APPARATUS FOR A GAS DYNAMIC PRESSURE-WAVE MACHINE FOR CHARGING COMBUSTION ENGINES

BACKGROUND OF THE INVENTION

The present invention relates to a new and improved construction of control apparatus for use in a gas dynamic pressure-wave machine for charging combustion engines.

Generally speaking, with the control apparatus for a gas dynamic pressure-wave machine as contemplated by the invention, the high-pressure exhaust gas channel of the pressure-wave machine is provided at a location forwardly where it opens into the housing of the cell rotor with a gas pocket for branching-off high-pressure exhaust gases into a shunt or auxiliary flow at certain operating conditions of the engine.

In order to improve the scavenging or flushing of a gas dynamic pressure-wave machine of a charged combustion engine in the idle temperature range below 300° C. there are used gas pockets into which there is branched-off part of the high-pressure exhaust gas which enters the pressure-wave machine, whereas the remaining part of the high-pressure exhaust gas directly enters into the cells of the rotor and performs the actual compression work. With such design the part of the high-pressure exhaust gas which produces the compression work generates, at full load operation of the engine, the charging or boost pressure needed therefor.

On the other hand, if a pressure-wave machine, for instance employed in conjunction with passenger vehicles, is optimumly designed for low full load rotational speeds, then at high full load rotational speeds it delivers too high charging pressures, Hence, with such applications the inflow to the gas pocket in the idle temperature range must be open in order to improve scavenging and also in the temperature range of the high full load rotational speed in order to reduce the too high charging pressure, whereas such inflow or infeed must be closed in the temperature range of the low full load rotational speeds.

Therefore, in order to obtain a satisfactory accommodation of the delivery characteristic for the combustion air it is necessary to control the gas pocket inflow in accordance with what has been previously explained.

A heretofore known solution which proceeds in this direction, as disclosed in Swiss Pat. No. 330,610, contemplates either diminishing the excessive charging or boost pressure or the flow of the high-pressure exhaust gas which is conducted through the pressure-wave machine by using an excess pressure relief device, for instance an automatically opening flap valve. The excess charging air is then exhausted into the surroundings or a part of the high-pressure exhaust gas, prior to entry into the pressure-wave machine, is delivered by an auxiliary or shunt line directly into the low-pressure exhaust gas line, i.e., is infed to the exhaust gas line and thus delivered to the surroundings or ambient atmosphere.

These heretofore known measures for the accommodation of the delivery characteristic of a pressure-wave machine to the momentary air requirements of the engine are however unsatisfactory as concerns their mode of operation, since they do not allow for any continuous control of the gas or air flow, as the case may be. They open and close at predetermined pressures, and furthermore there possibly occurs a certain accommodation of the throughflow by performing a velocity and cross-sectional area dependent throttling by the action of the flap member or valve. Importantly, they fail to take into account the temperature which likewise must be employed as a control parameter in order to obtain an optimum operating behavior of the engine. Apart from the foregoining there is also to be mentioned that the energy of the exhausted charging or boost air and the gase which outflows through the exhaust manifold is lost for energy balancing the assembly or unit and also for scavenging in the cell rotor.

From the standpoint of the operational security or integrity of the system there is also to be mentioned that the described exhaust or auxiliary flow devices are subjected to pronounced wear by the action of the high temperatures and the frequent actuation of their components or parts, such as bolts, springs, levers and the like, and due to the carbon or soot present in the exhaust gases also experience a decisive contamination, and hence, are correspondingly prone to malfunction or disturbance.

SUMMARY OF THE INVENTION

Therefore, with the foregoing in mind it is a primary object of the present invention to provide a new and improved construction of control apparatus for a gas dynamic pressure-wave machine for charging combustion engines in a manner which is not associated with the aforementioned drawbacks and limitations of the prior art proposals.

Another and more specific object of the present invention is to provide an improved control apparatus of the character described wherein it is possible to control the gas pocket inflow over the entire engine operating range with as rational as possible expenditure in equipment and as a function of the engine load.

Since the immediately preceding object is a function of the temperature of the high-pressure exhaust gas prior to entry into the cell rotor, it is a further object of the invention to provide a device for this control which alters as a function of temperature the cross-sectional area of the gas pocket inflow.

Now in order to implement these and still further objects of the invention which will become more readily apparent as the description proceeds, the control apparatus of the present development is manifested by the features that there is provided a flap member in the high-pressure exhaust gas channel and which is arranged in the housing of the pressure-wave machine. The flap member is rigidly or fixedly clamped along one of its edges and undergoes a bending deformation in the presence of temperature changes. The flap member forms a partition or separation wall between the high-pressure exhaust gas channel and the gas pocket. The magnitude and course of the temperature-dependent bending deformation of the flap member corresponds to the temperature-dependent opening characteristic of the inflow cross-sectional area or cross-section of the gas pocket which is desired for the pressure-wave machine.

The aforementioned temperature is beneficially used for controlling the gas pocket inflow in order to thereby avoid the drawbacks of the prior art devices heretofore discussed.

BRIEF DESCRIPTION OF THE DRAWINGS

The invention will be better understood and objects other than those set forth above, will become apparent when consideration is given to the following detailed description thereof. Such description makes reference to the annexed drawings wherein throughut the various Figures there have been generally used the same reference characters to denote the same or analogous elements and wherein.

DETAILED DESCRIPTION OF THE PREFERRED EMBODIMENTS

Figure 1:
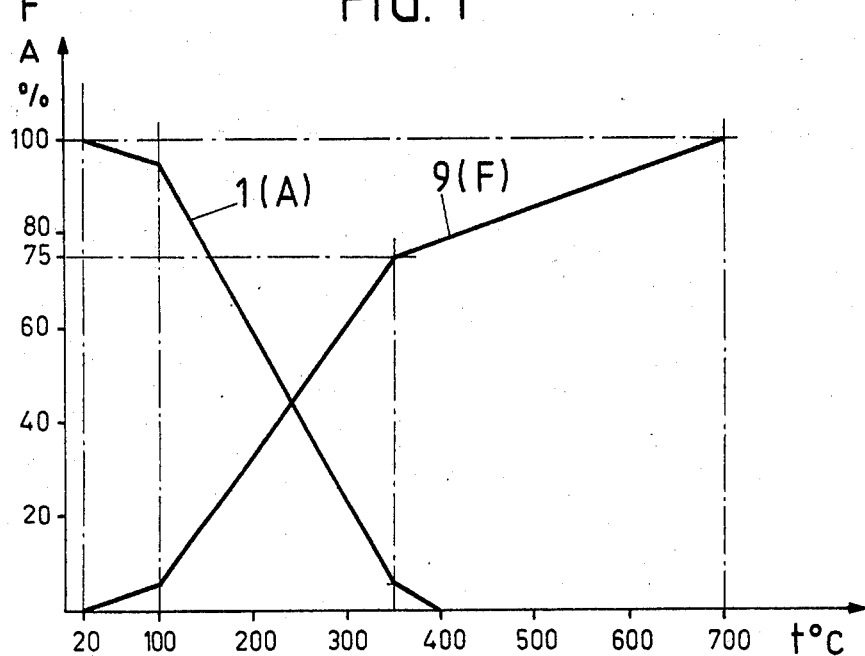
FIG. 1 is a diagram of the opening characteristic of the gas pocket control used with a commercial vehicle, such as a truck diesel engine.
Figure 2:
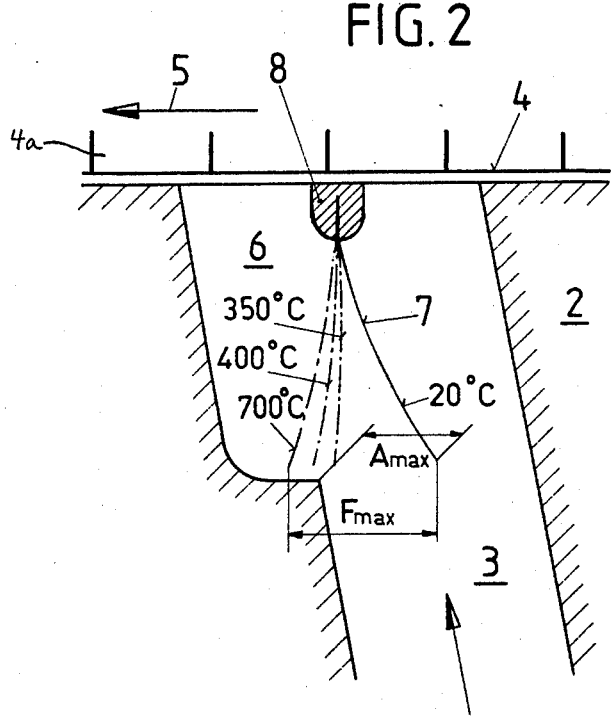
FIG. 2 illustrates an exemplary embodiment of control apparatus by means of which there can be obtained the opening characteristic portrayed in FIG. 1.

Describing now the drawings, it is to be understood that FIGS. 1 and 2 relate to the use of the inventive control apparatus in conjunction with a commercial vehicle, such as a truck diesel engine, the pressure-wave machine of which is designed such that at the full load temperature it delivers the charging or boost pressure needed for the full load. Moreover, the cross-sectional area or cross-section of the gas pocket inflow should continuously decrease from the maximum value at an ambient temperature of 20° C. until reaching the upper threshold of about 350° C. of the idle temperature range. This correlation between the inflow cross-sectional area of the gas pocket which is to be controlled and the temperature has been illustrated in the diagram of FIG. 1 by the line or curve 1. In this diagram there is plotted along the abscissa the temperature of the high-pressure exhaust gases prior to entry into the cell rotor and along the ordinate thre has been plotted, as a percent of the full opening cross-section $A_{max}$, the cross-sectional area A of the gas pocket inflow as well as the path F through which moves the controling element as a percentage of the maximum deflection $F_{max}$.

The control apparatus, by means of which this temperature-dependent control of the inflow cross-section of the gas pocket can be realized, has been illustrated in FIG. 2. In particular, FIG. 2 constitutes a fragmentary sectional view of a housing 2 containing a high-pressure exhaust gas channel 3 at the inlet to a cell rotor 4, the direction of rotation of which has been indicated by the arrow 5. The end of the channel 3 is enlarged in known manner so as to form a gas pocket 6 from which there can be branched-off a more or less large part of the high-pressure exhaust gases out of the channel 3 until attaining the full load temperature, in order to improve the scavenging in this operating range.

The temperature-dependent control of the gas pocket inflow is brought about by a flow control element, here constituted by a bimetallic flap member or valve 7 which is rigidly or fixedly clamped in a web or holder 8 or equivalent fixation element extending over the entire width of the gas pocket 6. The pairing of the bimetallic components, of the control element, in other words, the different metals from which there is formed the bimetallic flap member 7 and the shape of the flap member 7 at room or ambient temperature are chosen such that if frees or leaves open the complete inflow cross-section to the gas pocket 6 at ambient temperature and gradually reduces and then completely closes such inflow cross-section to the gas pocket 6 during run-up of the pressure-wave machine with increasing temperature. In FIG. 2 there has been shown in full lines the starting position of the flap member 7 at a room or ambient temperature of about 20° C., and there has also been shown in broken lines several intermediate positions which the flap member 7 occupies as well as the position at an assumed maximum temperature of 700° C.

The desired temperature-dependent opening characteristic of the bimetallic flap member 7, i.e., its temperature-dependent deformation, can be obtained by resorting to different measures. As evident from the exemplary arrangements of FIGS. 11a to 11d, this is possible for instance by appropriately selecting both of the metal components of the bimetallic flap member 7, by continuously and/or in stages or sections altering their wall thickness over the length of the flap member 7, by connecting in succession over the length of the flap member different bimetallic pairings and/or different length bimetallic pairs or pairings, by connecting in succession side-reversed or mirror-image identical or different bimetallic pairings as well as by resorting to various combinations of these techniques or measures.

As mentioned, FIG. 11a to 11d show in respective side views a number of examples of such combinations, wherein the components or metal parts having the value null or the smallest value of the coefficient of expansion, typically and by way of example and not limitation invar-alloys, have not been shown with any cross-hatching. The different other components or parts have been shown differently cross-hatched in the drawings.

The line or curve 1 of FIG. 1 shows in an idealized form the desired course of the inflow cross-section of the gas pocket 6 as a function of the temperature t. In accordance therewith gas pocket the cross-section or cross-sectional area should be reduced up to a temperature of about 100° C. by a small amount, say approximately 5%, thereafter the flap member or valve 7 almost completely closes until reaching a temperature of approximately 350° C. and is then completely closed upon reaching a temperature of about 400° C.

The second line or curve 9 of FIG. 1 likewise shows in an idealized form the temperature-dependent deformation course of an experimentally examined bimetallic flap member, as the same can be beneficially employed for the control of the gas pocket inflow of the arrangement of FIG. 2. The full deflection or movement of the free or unclamped end of the flap member 7 in the temperature range or interval of 20° C. to 700° C. has been designated in FIG. 2 by reference character $F_{max}$, whereas, on the other hand, in FIG. 1 there has been plotted along the ordinate the values of F as a percent of $F_{max}$. The course of the edge deflection of such bimetallic element exhibits at approximately 100° C. and at approximately 350° C. pronounced kink or bend locations which, in reality, however are less pronounced than in the idealized graphic representation of FIG. 1.

Figure 3:
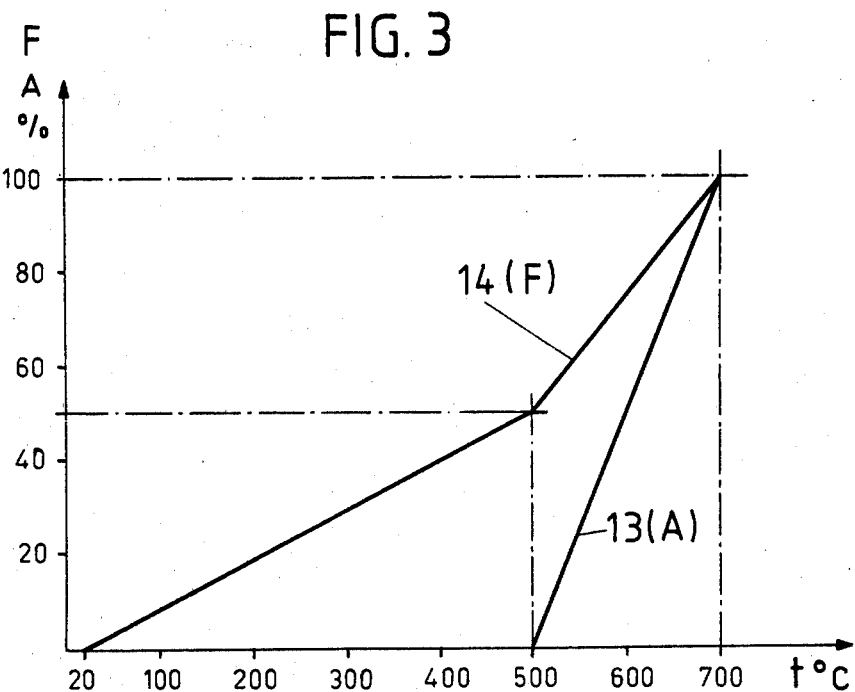
FIG. 3 is a diagram of the opening characteristic of the gas pocket control for a diesel engine used in passenger vehicles.
Figure 4:
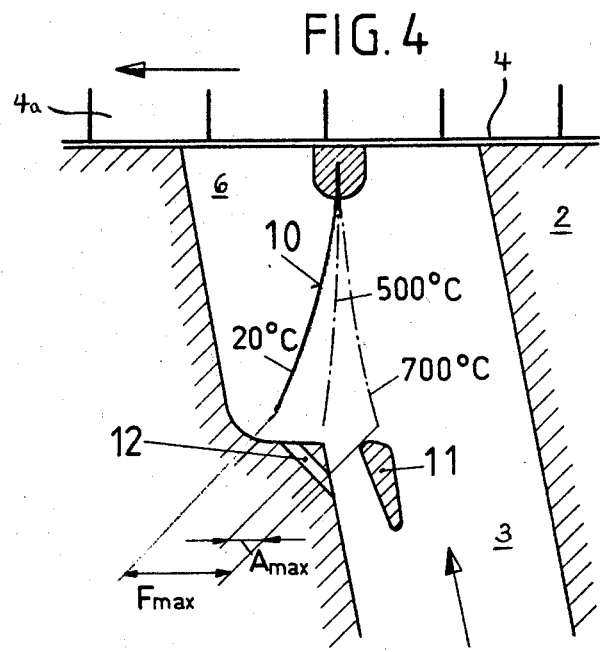
FIG. 4 illustrates an exemplary embodiment of control apparatus which is capable of attaining the opening characteristic shown in FIG. 3.

The diagram and the embodiment of apparatus of FIGS. 3 and 4, respectively, relate to an evaluation of the inventive control apparatus in conjunction with a diesel engine for passenger vehicles.

In accordance with what has been heretofore stated in this case the too high charging or boost pressure must be reduced at full load, approximately in the temperature range of 500° C. to 700° C. This is accomplished by withdrawing part of the high-pressure exhaust gases into the gas pocket 6, from which location it arrives by means of the schematically represented cells 4a of the rotor 4 directly into the exhaust gas line or manifold. With this control characteristic the bimetallic flap member 10 is closed at room temperature and upon reaching a temperature of the exhaust gases of approximately 500° C. assumes a position beginning with which the gas pocket inflow is increasingly further opened with increasing temperature. At approximately 700° C. the bimetallic flap member 10 reaches its maximum deflection. In order to stabilize the inflow cross-section, at this position of the flap member 10, there is provided a flow divider 11. This flow divider 11 limits the deflection of the flap member 10 which is necessary because by virtue of the reduced primary flow of the high-pressure exhaust gases and the thus reduced excess air in the engine the exhaust gas temperature further increases and the deflection of the flap member 10 would still further increase.

Since however also here for engine starting and during idling there is branched-off into the gas pocket high-pressure exhaust gases in order to improve scavenging, there is provided in this case a conventional gas pocket channel or duct 12 which, in the aforementioned operating phases, allows the inflow of high-pressure exhaust gas into the gas pocket 6.

The behavior of this apparatus has been illustrated in the diagram of FIG. 3. Just as was the case for the diagram of FIG. 1 there has been plotted along the ordinate, and as represented by reference characters A and F, the cross-section of the gas pocket inflow and the deflection of the free end of the bimetallic flap member 10, respectively, as a percentage of the maximum values of A and F. The line or curve 13 demonstrates that opening of the inflow cross-section or cross-sectional area A begins at 500° C. and terminates at 700° C. At room or ambient temperature the bimetallic flap member 10 is in its starting position internally of the gas pocket, out of which it first then moves upon reaching a temperature of about 500° C. and then frees the inflow cross-section A in accordance with the course of the curve represented by the line 13. The course of the deflection F of the flap member 10 is represented by the line or curve 14.

Figure 5:
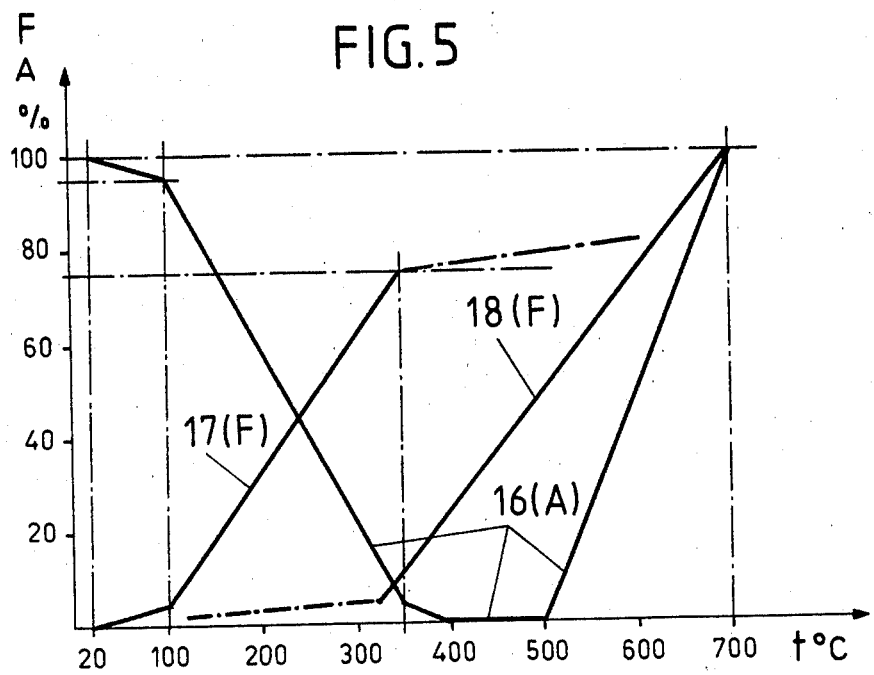
FIG. 5 is a diagram of an opening characteristic which covers the entire operating range of an engine.
Figure 6:
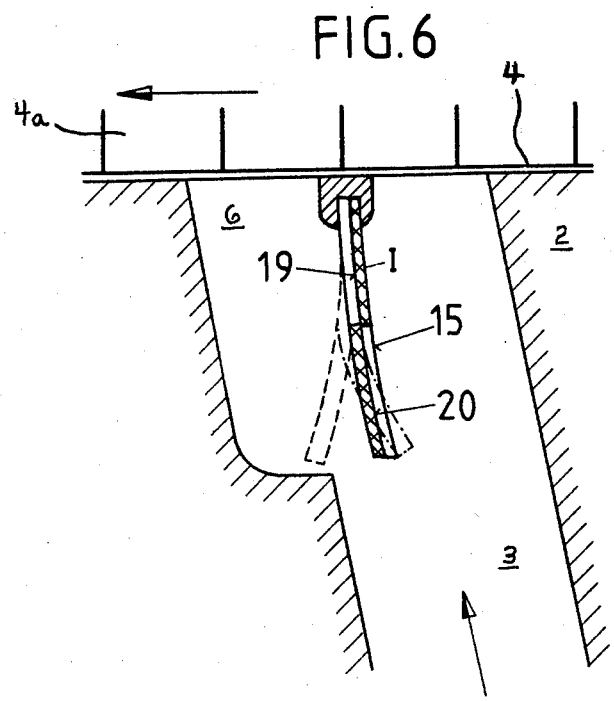
FIG. 6 illustrates a control apparatus for obtaining the opening characteristic shown in FIG. 5.

FIGS. 5 and 6 relate to a bimetallic flap member 15 composed of two different bimetal pairings, which for instance can be beneficially employed in conjunction with a diesel engine for a passenger vehicle in the event that at such diesel engine a gas pocket channel 12 according to the embodiment of FIG. 4 impairs the engine running behavior at full load and low rotational speeds.

In FIG. 5 the line or curve 16 again schematically represents the desired temperature-dependent opening course of the inflow cross-section A of the gas pocket, whereas the lines or curves 17 and 18 represent the deflection F of the bimetallic portions 19 and 20 of the composite or assembled bimetallic flap member 15. The line or curve 17 is attributable to the bimetallic portion 19 which markedly curves until reaching a temperature of approximately 350° C., whereas the second bimetallic portion or section 20, in this temperature interval, only experiences a slight curvature or deflection as indicated by the chain-dot line. At the end of this temperature interval the bimetallic flap member 15 therefore has assumed the position shown in broken lines in FIG. 6, i.e., the gas pocket inflow is completely blocked. The two bimetallic portions behave in converse manner in the upper temperature range between approximately 350° C. and 700° C., so that now the flap member 15 again curves or deflects back with increasing temperature in accordance with the terminal or end position shown by chain-dot lines and upon reaching the upper temperature threshold has freed the inflow to the gas pocket to a desired degree in order to thereby reduce the charging air pressure.

Figure 7:
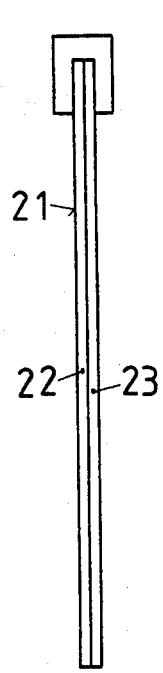
FIG. 7 is a schematic illustration of a bimetallic flap member used in the apparatus of FIG. 6 and serving as a control element.
Figure 8:
FIG. 8 is a diagram illustrating the temperature-dependent course of the coefficient of expansion of the metallic components or different metals of a bimetallic flap member of the type shown in FIG. 7.
Figures 11A, 11B:
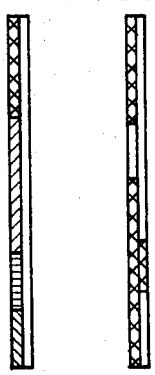
FIGS. 11a–11d illustrate different exemplary embodiments of bimetallic flap members.
Figures 11C, 11D:
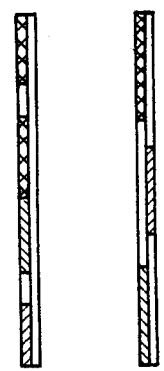

FIGS. 7 and 8 illustrate a bimetallic flap member 21 which is suitable for use with the apparatus of FIG. 6 and also shows the related diagrams of the coefficients of thermal expansion of both of its metal components or parts 22 and 23. The action of this bimetallic pairing corresponds to that of the combined pairing of the flap member 15 for the arrangement of FIG. 6. The coefficient of expansion $\alpha(22)$ associated with the component 22 ascends in a lower temperature range quite intensely and remains relatively constant throughout an upper temperature range. The other coefficient of expansion $\alpha(23)$ behaves in converse manner, so that a bimetallic element which has been assembled together from the metal components in this manner, upon passing through the entire temperature range or interval, again deflects or bends-out oppositely and finally, as desired for the apparatus of FIG. 6, assumes a substantially S-shaped configuration.

Figure 9:
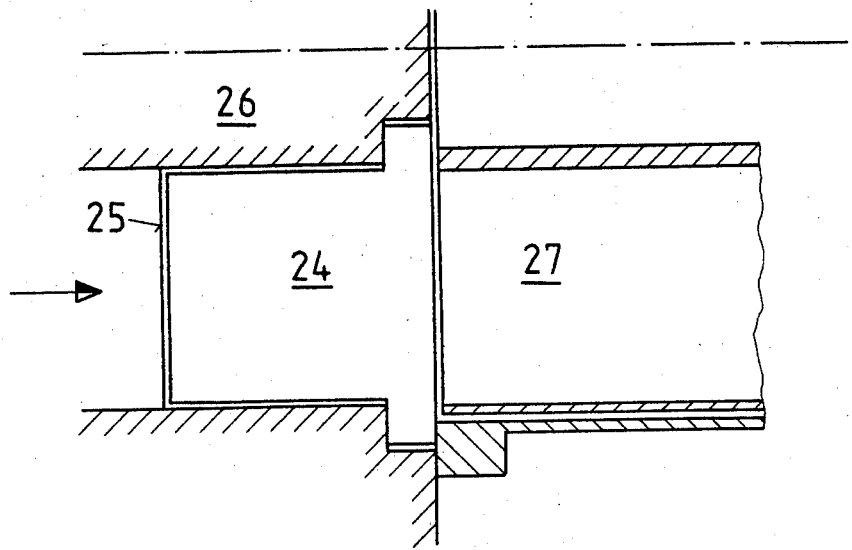
FIG. 9 schematically illustrates the arrangement of a bimetallic flap member forwardly of a gas pocket.
Figures 10A, 10B, 10C, 10D:
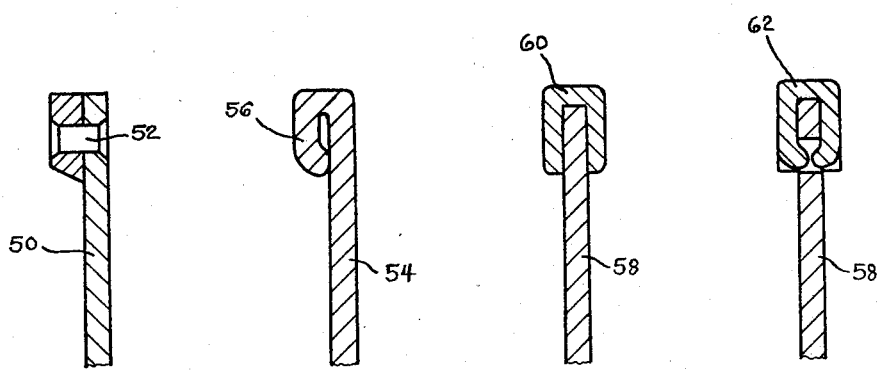
FIGS. 10a–10d illustrate different attachment or fixation possibilities for a bimetallic flap member in the housing of a pressure-wave machine.

FIG. 9 illustrates a possibility of designing the contour or outline of a bimetallic flap member 24. The outline of the gas pocket has been represented in FIG. 9 by reference character 25, the housing surrounding the high-pressure exhaust gas channel has been designated by reference character 26, and the cell rotor by reference character 27.

In FIGS. 10a to 10d there are shown, by way of example and not limitation, attachment possibilities for the bimetallic flap member in the housing. Specifically, in FIG. 10a the flap member 50 can be fastened at one one end by rivets 52 or equivalent or other suitable fastening structure, in FIG. 10b the flap member 54 can be fastened by forming a flexed or bent end 56 thereat, and in FIGS. 10c and 10d the respective flap members 58 can be held at one end in a suitably configured holder or attachment element 60 and 62, respectively.

As already mentioned heretofore, FIGS. 11a to 11d illustrate combinations of different bimetallic pairings. Depending upon the selected pairing, length or thickness of the components or parts of the bimetallic element, it is possible in this manner to realize spatially localized different curvatures, and thus, in accommodation to a desired course of the cross-sectional control of a gas pocket inflow, to obtain the thus required temperature-dependent course of the free end or edge deflection of the bimetallic flap member.

A further possible means for obtaining a temperature-dependent control of the gas pocket inflow is to use flap members or equivalent structure formed of shape-memory alloys, particularly then when such flap members or the like need not be continuously controlled, rather if there is sufficient therefor also a stepwise or sudden or jump-like opening action.

While there are shown and described present preferred embodiments of the invention, it is to be distinctly understood that the invention is not limited thereto, but may be otherwise variously embodied and practiced within the scope of the following claims.

Accordingly, what we claim is:

1. A control apparatus for use in a gas dynamic pressure-wave machine for charging combusion engines, comprising:
a pressure-wave machine provided with a high-pressure exhast gas channel;
said pressure-wave machine including a housing containing a cell rotor;
said high-pressure exhaust gas channel being provided with a gas pocket at a location before opening into the cell rotor in order to branch-off high-pressure exhaust gases into an auxiliary flow at predetermined operating conditions of the engine;
a flap member arranged in the high-pressure exhaust gas channel;
said flap member being fixedly clamped in the housing of the pressure-wave machine along one of its edges;
said flap member experiencing a bending deformation when exposed to temperature changes;
said flap member forming a partition wall between the high-pressure exhaust gas channel and the gas pocket; and
the flap member being structured to possess a temperature-dependent bending deformation whose magnitude and course corresponds to a temperature-dependent opening characteristic of an inflow cross-section of the gas pocket and which is desired for the pressure-wave machine.

2. The control apparatus as defined in claim 1, wherein:
the flap member comprises a bimetallic element.

3. The control apparatus as defined in claim 2, wherein:
said bimetallic flap member is composed of a combination of different metal pairings.

4. The control apparatus as defined in claim 3, wherein:
said bimetallic flap member comprises two mutually contacting bimetallic pairings, the bending deformation of which is opposite to one another;
one of the bimetallic pairings experiencing an appreciably greater bending deformation throughout a lower temperature range than the other bimetallic pairing whose bending deformation is appreciably greater than the first bimetallic pairing in a higher temperature range.

5. The control apparatus as defined in claim 2, wherein:
the bimetallic element is formed of two components;
the coefficient of thermal expansion of the one component of the bimetallic flap member markedly increasing in a lower temperature range and at most slightly increasing at an upper temperature range; and
the other component of the bimetallic element behaving conversely with respect to its coefficient of thermal expansion in the aforementioned temperature ranges.

6. The control apparatus as defined in claim 5, wherein:
the coefficient of thermal expansion of the one component essentially does not increase in said upper temperature range.

7. The control apparatus as defined in claim 2, further including:
flow divider means arranged in the high-pressure exhaust gas channel at the region of a fully open position of the bimetallic flap member; and
a gas pocket channel for feeding the gas pocket when the gas inflow to the gas pocket is blocked by the bimetallic flap member.

* * * * *